Sept. 19, 1944. O. FIEDLER 2,358,499
METHOD OF SECURING METAL PARTS BY THERMO-TENSION
Filed Oct. 5, 1942
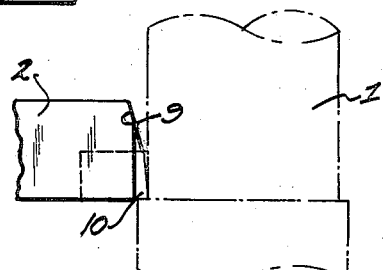
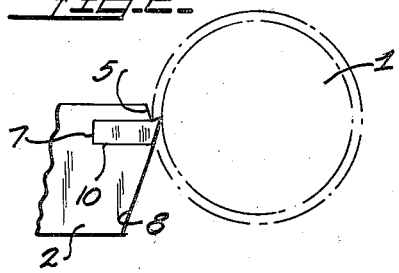
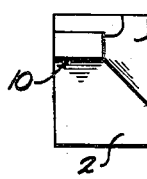
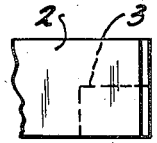
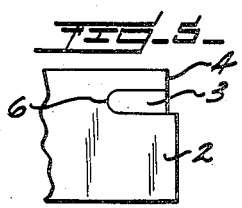
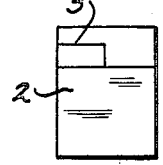
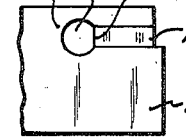
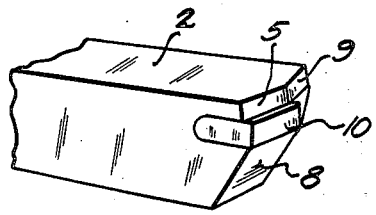
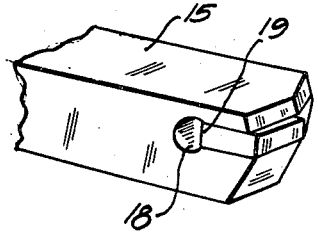
INVENTOR.
OSCAR FIEDLER.
BY
Samuel Weisman Patented Sept. 19, 1944

2,358,499

UNITED STATES PATENT OFFICE 2,358,499

METHOD OF SECURING METAL PARTS BY THERMOTENSION

Oscar Fiedler, Detroit, Mich.

Application October 5, 1942, Serial No. 460,880

6 Claims. (Cl. 76—101)

The present invention pertains to a novel method of joining or securing two metal parts in an assembly where one of the parts is to be inserted in the other. The invention lends itself particularly to the insertion of tungsten carbide cutting tips in their shanks although it is generally applicable in cases where the two parts consist of a metal or metals capable of being machined with great accuracy.

The invention involves a novel reaction between the inserted and the receiving parts. I have not determined whether the action is physical or chemical but am of the opinion that it is a molecular action and have applied to it the term thermo-tension.

Briefly, the method consists in heating the shank or receiving part to about 1500° F., chilling the male part to the temperature of liquid air or lower, and inserting one into the other. This is similar to the conventional shrink-on process except for the chilling of the male part, but the bond produced is entirely different.

The shrink-on process results merely in a physical tightening of the shank around the inserted part in the nature of a clamp. There is no interaction between the two parts, and the inserted part frequently becomes loose, especially in the case of cutting tools. In my method, however, the wide temperature differential results in an interaction between the two parts. I have not determined exactly the nature of the action, but the character of the bond leads me to the belief that there is a molecular penetration of each part into the other or a molecular exchange between the parts.

The same temperature differential could not be obtained by merely heating the receiving member to a still higher temperature, because such a high temperature would render the metal too soft for manipulation.

In the handling of tungsten carbide tips I have found that the low temperature causes very little contraction but increases the strength and toughness of the alloy with the result that there is less liability of breakage in the inserting operation. The increase in the strength of the chilled part may be attributed to such contraction as does occur and is therefore characteristic of any metal so treated, whether it be tungsten carbide, high-speed steel, or other metal.

The socket in the receiving part is machined to dimensions slightly smaller than those of the male part. When the receiving part is heated, the socket is expanded to a size adapted to receive the male part. On cooling, there is a contraction of the socket walls against the inserted part, bringing the surfaces into close physical contact for the above described molecular exchange.

The invention is fully disclosed by way of example in the following description and in the accompanying drawing in which Figure 1 is a plan view showing the tool applied to the work;

Figure 2 is a corresponding side elevation;

Figure 3 is a front end view of the tool;

Figure 4 is a plan view of the blank before insertion of the tip;

Figure 5 is a corresponding side elevation;

Figure 6 is a corresponding front end view;

Figure 7 is a plan view of the tip before being ground;

Figure 8 is a corresponding side elevation;

Figure 9 is a corresponding front end view;

Figure 10 is a side elevation of a modified form of shank;

Figure 11 is a front end view thereof;

Figure 12 is a perspective view of the tool assembled according to Figures 1 to 9;

Figure 13 is a perspective view of a tool having the style of shank shown in Figures 10 and 11, and Figure 14 is a diagram of the operations.

Reference to these views will now be made by use of like characters which are employed to designate corresponding parts throughout.

Figures 1 and 2 show the tool applied to a work piece 1 held, for example, in a lathe. The general construction of the tool is not new, except in the matters of assembly hereinafter described.

The shank 2 may be square in cross section and has a slot 3 cut in one of the forward corners, extending some distance inward from the front end but not entirely across said end, as shown in Figures 1, 4, and 6. Above the slot the forward end is foreshortened at 4 and bevelled upwardly at 5. The base of the slot is originally curved at 6 but is finally squared off at 7 by use of a suitable tool. From the forward lower edge of the slot, the forward end wall is bevelled downwardly at 8. The same end of the shank is bevelled off laterally from the slot as indicated by the numeral 9.

The metal tip to be inserted, which usually consists of tungsten carbide, is a piece 10 originally rectangular in plan and cross section. Its thickness relatively to the height of the slot 3 is critical in that it exceeds said height by about .004 inch. It fits into the width of the slot. The forward upper corner which remains exposed because of the foreshortening at 4 and the bevel 5 constitutes the working edge.

In the assembling of the tool, the tip is first chilled to about −200° F. This may be accomplished by exposure to liquid air which can be economically produced in the turbo compressor invented by Peter Kapitsa. The operations of grinding and chilling the tip are designated schematically at 11 in Figure 14.

At the same time, the shank 2 is heated to about 1500° F. without seriously altering its properties. The chilling and heating operations are designated schematically at 12 in Figure 14.

The two parts are then brought together as rapidly as possible in an assembly apparatus 13. This apparatus is of such a design as to insert the tip in the shank. The expansion of the shank at the high temperature widens the slot 3 sufficiently to receive the tip.

The contacting surfaces of the tip and shank, having a high temperature differential, undergo a molecular change in the manner described above, effecting a bond which is quite different from the clamping effect produced in the usual shrink-on process.

In the modification shown in Figures 11, 12 and 13, the shank 15 is drilled at the base of the slot 16 as indicated by the numeral 17, for the purpose of constructing a more perfectly square bottom. Into the drilled hole is inserted a dowel plug 18 which has previously been formed with a flap 19 to form a slot and square bottom wall for the tip. The remaining operations in the assembly of the tool are as previously described.

Although a specific embodiment of the invention has been herein disclosed it may be understood that various changes may be made in the details without departing from the scope of the invention as indicated by the appended claims.

What I claim is:

1. The method of securing a tungsten carbide male metal part in a receiving metal part, consisting in forming in the receiving part a cavity of smaller cross sectional area than that of the male part, heating said receiving part sufficiently to permit insertion of said male part, cooling the male part to about −220° F., and inserting the cooled male part into the heated receiving part.

2. The method of securing a tungsten carbide male metal part in a receiving metal part, consisting in forming in the receiving part a cavity of smaller cross sectional area than that of the male part, heating said receiving part to about 1500° F., cooling the male part to permit insertion of said male part, cooling the male part to about −220° F., and inserting the cooled male part into the heated receiving part.

3. The method of securing a tungsten carbide male metal part in a receiving metal part, consisting in forming in the receiving part a cavity of smaller cross sectional area than that of the male part, accurately machining the surfaces of said cavity and male part, heating said receiving part to about 1500° F., cooling the male part to permit insertion of said male part, cooling the male part to about −200° F., and inserting the cooled male part into the heated receiving part.

4. The method of securing a tungsten carbide male metal part in a receiving metal part, consisting in forming in the receiving part a cavity of smaller cross sectional area than that of the male part, heating said receiving part sufficiently to permit insertion of said male part, cooling the male part with liquid air to a temperature approximating that of liquid air and inserting the cooled male part into the heated receiving part.

5. The method of securing a tungsten carbide male metal part in a receiving metal part, consisting in forming in the receiving part a cavity of smaller cross sectional area than that of the male part, heating said receiving part to about 1500° F., cooling the male part with liquid air to a temperature approximating that of liquid air and inserting the cooled male part into the heated receiving part.

6. The method of securing a tungsten carbide male metal part in a receiving metal part, consisting in forming in the receiving part a cavity of smaller cross sectional area than that of the male part, accurately machining the surfaces of said cavity and male part, heating said receiving part to about 1500° F., cooling the male part with liquid air to a temperature approximating that of liquid air and inserting the cooled male part into the heated receiving part.

OSCAR FIEDLER.